(12) United States Patent  (10) Patent No.: US 7,969,821 B2
Yonak  (45) Date of Patent: Jun. 28, 2011

(54) METHOD AND SYSTEM FOR LOCATING A WAVE SOURCE WITHIN A DEFINED AREA

(75) Inventor: Serdar H. Yonak, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1183 days.

(21) Appl. No.: 11/623,920

(22) Filed: Jan. 17, 2007

(65) Prior Publication Data

US 2008/0170472 A1 Jul. 17, 2008

(51) Int. Cl.
*G01S 3/801* (2006.01)
(52) U.S. Cl. ........................................ 367/129
(58) Field of Classification Search .............. 367/125, 367/129, 118
See application file for complete search history.

(56) References Cited

U.S. PATENT DOCUMENTS

| | | |
|---|---|---|
| 3,626,365 A | 12/1971 | Press et al. |
| 3,859,623 A | 1/1975 | Koehler |
| 3,867,719 A | 2/1975 | Perrin |
| 3,873,963 A | 3/1975 | Neal et al. |
| 4,158,190 A | 6/1979 | Stefanov |
| 4,212,085 A | 7/1980 | Vaillancour et al. |
| 4,380,004 A | 4/1983 | Coats et al. |
| 4,587,522 A | 5/1986 | Warren |
| 4,952,931 A | 8/1990 | Serageldin et al. |
| 4,956,866 A | 9/1990 | Bernstein et al. |
| 5,278,553 A | 1/1994 | Cornett et al. |
| 5,495,242 A | 2/1996 | Kick et al. |
| 6,160,758 A * | 12/2000 | Spiesberger ............... 367/125 |
| 6,686,849 B1 | 2/2004 | Cullett |
| 6,859,147 B2 | 2/2005 | Buscemi |
| 2004/0233067 A1 | 11/2004 | Cho |

OTHER PUBLICATIONS

"Sound Recognition", Mitsubishi Electric Research Laboratories, Iwamoto-san et al., Jun. 16, 2006.
"Narrow-band performance of phase-conjugate arrays in dynamic random media", Dowling, D.R. et al., Journal of the Acoustical Society of America, vol. 91, pp. 3257-3277 (1992).
"Sound localization in noisy and uncertain ocean environments", Fialkowski, et al., Journal of the Acoustical Society of America, vol. 101, pp. 3539-3545 (1997).

* cited by examiner

*Primary Examiner* — Dan Pihulic
(74) *Attorney, Agent, or Firm* — Gifford, Krass, Sprinkle, Anderson & Citkowski, P.C.

(57) ABSTRACT

A method and system for locating a sound source within a defined area in which the sound data is collected with a plurality of spaced apart microphones. The sound data received by the microphones is processed to form a cross spectral density matrix containing vectors of cross correlations and auto correlations of the sound data. A replica vector matrix containing sound data from at least one test sound at a plurality of predetermined locations within the defined area is then constructed. The sound data vectors in the cross spectral density matrix are then projected on the replica vectors in the replica vector matrix to obtain a probability of the location of the sound source at each predetermined location within the defined area. These probabilities form a distribution within the defined area in which the largest probability distribution correlates with the location of the sound source.

34 Claims, 1 Drawing Sheet

METHOD AND SYSTEM FOR LOCATING A WAVE SOURCE WITHIN A DEFINED AREA

BACKGROUND OF THE INVENTION

I. Field of the Invention

The present invention relates to both a method and system for locating a wave, such as a sound wave, within a defined area.

II. Description of Related Art

There are many situations in the automotive industry and elsewhere where it is desirable to identify predetermined sounds and then locate the position of those sounds with respect to the vehicle. For example, emergency vehicles, such as ambulances and police cars, often travel at high speeds. Furthermore, such emergency vehicles often do not obey the standard traffic rules. For example, such emergency vehicles are not required to stop at stop signs, red traffic lights and, in some cases, even travel on the wrong side of the road in order to reach the emergency situation as fast as possible. As such, such emergency vehicles may appear at unexpected locations to other drivers of the road.

In order to avert a potential safety hazard, it would desirable to alert the driver of the automotive vehicle of the position of such emergency vehicles as well as other potentially hazardous conditions, such as a vehicle in the "blind spot."

There have been previously known systems which utilize one or more microphones in order to detect and warn the vehicle driver of the presence of an emergency vehicle by detecting a siren or similar sound from the emergency vehicle. These previously known systems, however, have merely used the amplitude of the received sound signal of the siren of the emergency vehicle in order to warn the vehicle driver. These previously known systems thus fail to account for reflections, echoes and the like of the sound wave from the emergency vehicle siren and are thus unable to accurately locate the position of the emergency vehicle or other desired detected sound.

SUMMARY OF THE PRESENT INVENTION

The present invention provides both a method and system for locating a sound source within a defined area which compensates for echoes, reflections and other environmental factors which affect the sound transmission from a defined sound source, such as a siren of an emergency vehicle.

In brief, sound data is collected at a known scanning rate from a plurality of microphones which are spaced apart from each other and mounted to the vehicle. For example, in a preferred embodiment of the invention, four microphones are mounted to the vehicle with one microphone adjacent each corner of a top of the vehicle.

The sound data from the microphone is then coupled as an input signal to a processor which utilizes the sound data to create a cross spectral density matrix containing vectors of cross correlations and auto correlations of the sound data for each microphone at least one, and preferably several, frequency range segments. Although different means may be utilized to create the cross spectral density matrix, in one embodiment of the invention, the received sound data is converted from the time domain to the frequency domain to form a frequency domain sound vector data matrix. The data in the frequency domain sound vector is then filtered by using one or more matched filters in which each matched filter corresponds to a predetermined sound desired to be detected. For example, one matched filter may correspond to an ambulance siren, a second matched filter correspond to a police siren, a third matched filter correspond to the sound of a horn, a different matched filter correspond to wheel noise on pavements, etc.

Whenever the filtered data is below a predetermined threshold, indicative of the absence of a particular sound desired to be detected, the processing is terminated until the next scan of the sound data.

In the event that the filtered sound data exceeds the threshold, indicative of the presence of a desired sound to be detected, the processor creates a replica vector matrix containing sound data from at least one test sound at a plurality of predetermined locations within a defined area for at least one, and preferably several, frequency range segments. For example, for an automobile, a defined area of interest may constitute a quarter of a mile or so. Although different means may be used to construct the replica vector data, in the preferred embodiment of the invention, a grid is mathematically imposed upon the defined area and Green's function is used to calculate the expected received data for each microphone for each grid intersection in the defined area and preferably over a plurality of different frequency range segments.

Following construction of the replica vector matrix, the filtered sound data vectors are projected on the replica vectors to obtain a probability of the location of the sound source at each grid intersection. These probabilities thus form a distribution within the defined area in which the largest distribution corresponds to the location of the sound source.

Once the sound source is detected, the processor outputs an appropriate signal to an appropriate device to alert the driver. Such a device may constitute a video screen or the like.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
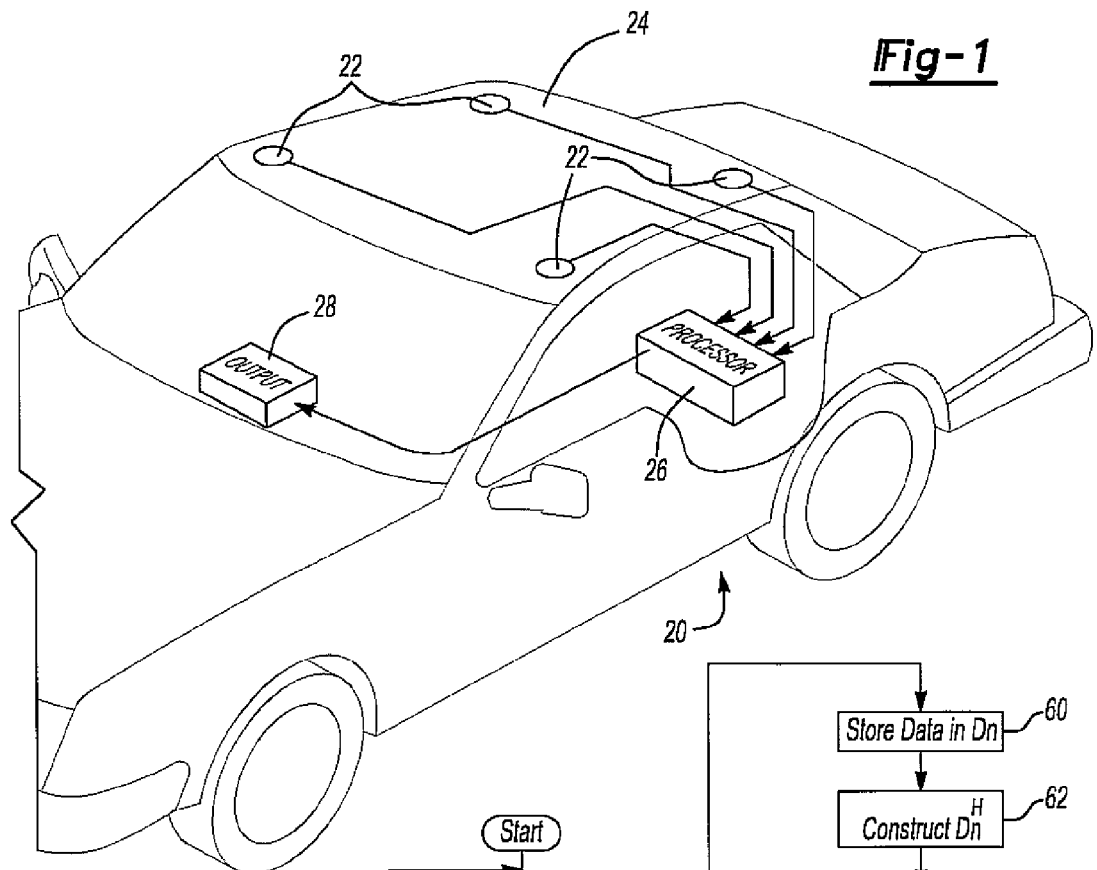
FIG. 1 is a diagrammatic view illustrating one embodiment of the present invention.

With reference first to FIG. 1, an exemplary automotive vehicle 20 is shown having at least two and preferably four sound wave receivers or microphones 22 mounted to the vehicle 20 so that the microphones 22 are spaced apart from each other. As shown in FIG. 1, the microphones are shown mounted adjacent each corner of the vehicle roof 24. However, the microphones 22 may be mounted at other locations on the vehicle 20 without deviation from the spirit or scope of the invention.

Using conventional circuitry, the data outputs from the microphones 22, which correspond to the sound received by each microphone, are connected as input signals to a processor 26. The processor 26, which is preferably microprocessor based, is preprogrammed to process the output signals from the microphones 22 in a fashion that will be subsequently described. The processor 26 also provides an output signal to an output device 28, such as a display screen, or other device.

Figure 2:
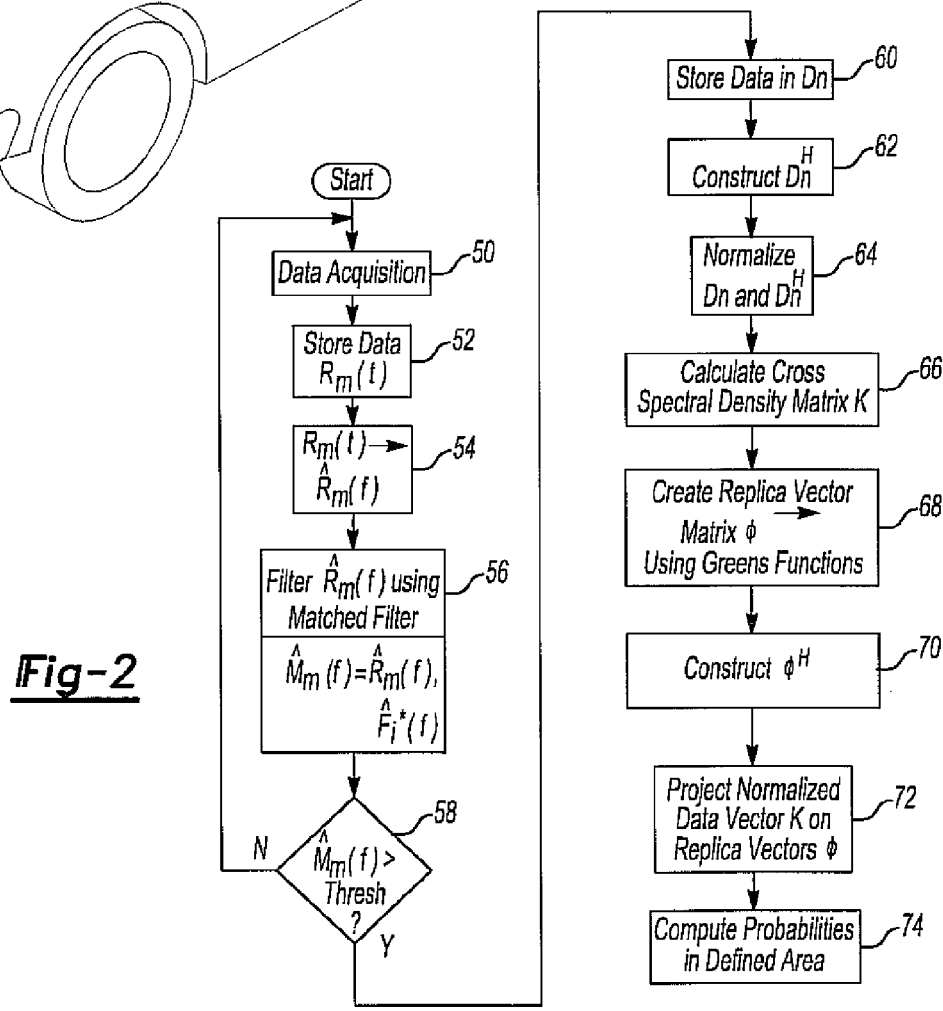
FIG. 2 is a flowchart illustrating the operation of the present invention.

With reference now to FIG. 2, in order to process and localize the sound data received by the microphones 22 and to identify potential sound wave sources that are of interest, e.g., a siren, it is first necessary to acquire the sound data at step 50. The data is acquired at step 50 at a scan rate that will vary depending upon the desired accuracy, range of data acquisition, computational speed, as well as other factors. For example, a sampling rate of 44 kilohertz will provide an accurate representation of a sound wave frequency from 0-22 kilohertz using Nyquist's theory. Such a range, i.e. 22 kilohertz, encompasses the full audio spectrum for the human ear.

Following the data acquisition at step 50, step 50 proceeds to step 52 where the acquired data is stored in an array R as follows:

$$\begin{bmatrix} R_1(t) \\ \vdots \\ R_m(t) \end{bmatrix}$$

where
R=raw data
m=microphone number
t=time

This raw sound data R contains not only a potential sound, such as a siren, which the present invention desires to detect, but also other noise that is also present. Furthermore, the raw sound data array R contains not only the amplitude information of the received sound, but also the phase information of that sound. After the sound data is stored at step 52, step 52 proceeds to step 54.

At step 54, the raw sound data in the time domain $R_m(t)$ is converted to the complex frequency domain $\hat{R}_m(f)$ for each element in the data array R. Although any means may be used to convert the time sound data $R_m(t)$ to the frequency domain, preferably a fast Fourier transform is performed for its high speed and simplicity. Step 54 then proceeds to step 56.

At step 56, the frequency domain sound data array $$\begin{bmatrix} \hat{R}_1(f) \\ \vdots \\ \hat{R}_m(f) \end{bmatrix}$$

is filtered using at least one, and more preferably several, matched filters $\hat{F}^*(f)$ in the following fashion:

$$\hat{M}_m(f) = \hat{R}_m(f) \cdot \hat{F}_i^*(f)$$

where
i=filter number
M=filtered data array
$\hat{F}_i^*(f)$=the complex conjugate of the matched filter i In practice, each filter 1-i corresponds to a different sound for which detection is desired. For example, one filter may correspond to a police siren, a second filter correspond to an ambulance siren, a third filter correspond to a fire engine siren, a fourth filter to one car horn, another filter to a different sound car horn, road noise from the wheels of an adjacent vehicle, etc. Thus, step 56 effectively eliminates, or at least reduces, noise and other extraneous sounds from the raw data $\hat{R}(f)$ and stores the filtered data in $\hat{M}(f)$. Step 56 then proceeds to step 58.

At step 58, the filtered sound matrix $\hat{M}(f)$ is compared to a preset threshold for each of the filters i. In the event that the filtered noise matrix $\hat{M}(f)$ is less than the threshold for each filter, indicative that none of the sounds for which detection is desired is present, step 58 branches back to step 50 where the above process is repeated. Conversely, if the filtered sound matrix $\hat{M}(f)$ is greater than the threshold for one or more of the filters i, step 58 proceeds to step 60.

At step 60, the data $\hat{M}_m(f_n)$ is stored in a data vector matrix $D_n$ as follows:

$$D_n = \begin{bmatrix} \hat{M}_1(f_n) \\ \hat{M}_2(f_n) \\ \vdots \\ \hat{M}_m(f_n) \end{bmatrix}$$

Step 60 then proceeds to step 62 where the Hermitian transpose $D_n^H$ is then constructed as follows:

$$D_n^H = [\hat{M}_1^*(f_n) \hat{M}_2^*(f_n) \hat{M}_3^*(f_n) \ldots \hat{M}_m^*(f_n)]$$

Step 62 then proceeds to step 64.

The data contained within both the data vector matrix $D_n$ as well as its Hermitian transpose $D_n^H$ are non-normalized and contain all of the amplitude and phase information for all of the microphones 22 and for all of the sample frequencies n. Both data vector matrices are then normalized as follows:

$$d_n = \frac{D_n}{|D_n|}$$

$$d_n^H = \frac{D_n^H}{|D_n^H|}$$

where
$d_n$=normalized vector matrix
$d_n^H$=Hermitian transpose of $d_n$

Step 64 then proceeds to step 66.

At step 66, the normalized data vector matrix d is then multiplied by its Hermitian transpose $d^H$ as follows:

$$K = dd^H$$

where K=cross spectral density matrix
which equates to the following:

$$K = \frac{1}{|D|^2} \begin{bmatrix} \hat{M}_1(f)\hat{M}_1^*(f) & \hat{M}_1(f)\hat{M}_2^*(f) & \hat{M}_1(f)\hat{M}_3^*(f) & \cdots & \hat{M}_1(f)\hat{M}_m^*(f) \\ \hat{M}_2(f)\hat{M}_1^*(f) & \hat{M}_2(f)\hat{M}_2^*(f) & \hat{M}_2(f)\hat{M}_3^*(f) & \cdots & \hat{M}_2(f)\hat{M}_m^*(f) \\ \hat{M}_3(f)\hat{M}_1^*(f) & \hat{M}_3(f)\hat{M}_2^*(f) & \hat{M}_3(f)\hat{M}_3^*(f) & \cdots & \hat{M}_3(f)\hat{M}_m^*(f) \\ \vdots & \vdots & \vdots & & \vdots \\ \hat{M}_m(f)\hat{M}_1^*(f) & \hat{M}_m(f)\hat{M}_2^*(f) & \hat{M}_m(f)\hat{M}_3^*(f) & \cdots & \hat{M}_m(f)\hat{M}_m^*(f) \end{bmatrix}$$

As can be seen from the above equation, the cross spectral density matrix contains all of the cross correlations and auto correlations for all of the microphones $M_1$-$M_m$ measurements made during the data acquisition. Once identification of the sound wave of interest and construction of the cross spectral density matrix is completed, step 66 proceeds to step 68 and localization of the detected sound source begins.

In order to perform localization of the detected sound source, a propagation model for the environment in which the acoustic source lies is needed. One such propagation model comprises the Green's function that solves the Helmholtz equation and accounts for acoustic properties of the environment including reflective boundaries that may cause echoes. It will be appreciated, of course, that different Green's functions may apply to different environmental topologies. For example, a Green's function for flat open country would differ from a Green's function for a city which included many buildings and other reflective surfaces. Such Green's functions are typically determined empirically and, in the preferred embodiment of the invention, a plurality of different Green's functions is stored by the processor 26 and the appropriate Green's function is selected depending upon topology surrounding the vehicle 20. Such topology can be determined in any number of ways, such as by GPS, laser, other types of object detectors, etc.

At step 68, a replica vector matrix is created using the appropriate Green's function G at each sample frequency and for each microphone 1-$m$. In order to construct the replica vector matrix, a grid is mathematically imposed upon a predefined area of interest, e.g. within one-quarter mile of the automotive vehicle. Green's function is then used to calculate both the amplitude and phase data for each microphone at each sample frequency f for each grid crossing to form the replica vector matrix $\Phi$ as follows:

$$\hat{G}(f, \vec{x}_m | \vec{x}_t)$$

where
$x_t$=test sound location
$x_m$=location of microphone
G=Green's function
f=frequency
The replica vector $\Phi$ is then constructed as follows:

$$\Phi(f, \vec{x}_t) = \begin{bmatrix} \hat{G}(f, \vec{x}_1 | \vec{x}_t) \\ \hat{G}(\vec{x}_2 | \vec{x}_t) \\ \hat{G}(\vec{x}_3 | \vec{x}_t) \\ \vdots \\ \hat{G}(\vec{x}_m | \vec{x}_t) \end{bmatrix}$$

where $\Phi(f, \vec{x}_t)$=replica vector matrix
Step 68 then proceeds to step 70 where the complex or Hermitian transpose of the replica vector matrix is also constructed as follows:

$$\Phi^H(\vec{x}_t) = [\hat{G}^*(f, \vec{x}_2 | \vec{x}_t) \hat{G}^*(f, \vec{x}_3 | \vec{x}_t) \ldots \hat{G}^*(f, \vec{x}_m | \vec{x}_t)]$$

where $\Phi^H(f, \vec{x}_t)$=Hermitian transpose of $\Phi(f, \vec{x}_t)$
Step 70 then proceeds to step 72.

At step 72, the cross spectral density matrix K is projected on the normalized replica vectors for each sample frequency using the Bartlett processor $B^{Bart}$ as follows:

$$B^{Bart}(f, \vec{x}_t) = \frac{\Phi^H(f, \vec{x}_t) K \Phi(f, \vec{x}_t)}{|\Phi(f, \vec{x})|^2}$$

The Bartlett processor produces a single value for each frequency and for each test point in the defined area, i.e. each grid intersection in the example given and for each frequency band segment n. The Bartlett processor thus provides a probability distribution throughout the grid of where the detected audio signal of interest is located. In practice, the probability distribution provided by the Bartlett calculations will generate a greater numerical value in the area of the actual sound source of interest is located.

Following the calculation of the Bartlett value for each frequency, an incoherent average may be utilized to sum the various sample frequencies for each test location in the defined area to obtain the broadband Bartlett value as follows:

$$B^{Bat}_{Broadband}(f, \vec{x}_t) = \int_{f_{lo}}^{f_{hi}} B^{Bart}(f, \vec{x}_t) df$$

As an alternative to the Bartlett processor, an MV (minimum variance) processor may be used to compute the probabilities within the defined area as follows:

$$B^{MV}(f, \vec{x}_t) = \frac{|\Phi(f, \vec{x}_t)|^2}{\Phi^H(f, \vec{x}_t) K^{-1} \Phi(f, \vec{x}_t)}$$

where $B^{MV}$=MV processor
and its incoherent errors calculated as follows:

$$B^{MV}_{Broadband}(f, \vec{x}_t) = \int_{f_{lo}}^{f_{hi}} B^{MV}(f, \vec{x}_t) df$$

The location of the sound source is then outputted by the processor 26 to the output device 28 at step 74.

From the foregoing, it can be seen that the present invention provides an effective means for identifying and localizing any of a plurality of different desired sound waves. Since the present invention maintains correlation of the various echoes and other reflections of the sound wave when performing its calculations, accurate localization of the desired sound signal source is obtained.

It will also be understood that, while the present invention has been described for use in detecting the location of an audible or sound wave signal source, the present invention may be used with any type of wave source. For example, for a radar system the wave detectors or microphones 22 are simply replaced by a wave detector or antenna for the expected signal. Otherwise, the application of both the identification as well as localization of the wave source remains the same.

Having described my invention, however, many modifications thereto will become apparent to those of skill in the art to which it pertains without deviating from the spirit of the invention as defined by the scope of the appended claims.

I claim:
1. A method for locating a sound source within a defined area comprising the steps of:
receiving sound data with a plurality of spaced apart microphones,
creating a cross spectral density matrix containing vectors of cross correlations and auto correlations of the sound data,
creating a replica vector matrix containing sound data from at least one test sound at a plurality of predetermined locations within the defined area,
projecting the sound data vectors on the replica vectors to obtain a probability of the location of the sound source at each predetermined location, said probabilities forming a distribution in the defined area,
outputting a signal representative of the largest probability distribution as the location of the sound source within the defined area.

2. The invention as defined in claim 1 wherein said step of creating the cross spectral density matrix comprises the steps of:
  converting the sound data from the time domain to the frequency domain for each microphone to form a frequency domain sound vector data matrix, and
  filtering the converted sound data with at least one matched filter corresponding to a predefined sound to form a filtered sound vector data matrix.

3. The invention as defined in claim 2 and comprising the step of disregarding filtered data below a predetermined threshold.

4. The invention as defined in claim 2 wherein said step of creating the cross spectral density matrix further comprises the step of normalizing the filtered sound vector data matrix.

5. The invention as defined in claim 4 wherein said step of creating the cross spectral density matrix further comprises the step of multiplying said normalized filtered sound vector data matrix by its Hermitian transpose.

6. The invention as defined in claim 1 wherein said step of creating the replica vector matrix further comprises the step of calculating the received sound vector data at each microphone from the test sound at each predetermined location in the defined area using a Green's function.

7. The invention as defined in claim 6 wherein said step of calculating the received sound vector data at each microphone from the test sound at each predetermined location in the defined area using a Green's function further comprises the step of calculating the received sound vector data at each microphone from the test sound at each predetermined location in the defined area using a Green's function at a plurality of different frequencies.

8. The invention as defined in claim 1 wherein said projecting step further comprises the step of applying Bartlett's processor to said cross spectral density matrix and said replica matrix.

9. The invention as defined in claim 8 and further comprising the step of applying Bartlett's processor over a plurality of discrete frequency segments which together form a frequency range, and forming an incoherent average of Bartlett's processor for each frequency segment over said frequency range.

10. The invention as defined in claim 1 wherein said projecting step further comprises the step of applying an MV processor to said cross spectral density matrix and said replica matrix.

11. The invention as defined in claim 8 and further comprising the step of applying the MV processor over a plurality of discrete frequency segments which together form a frequency range, and forming an incoherent average of the MV processor for each frequency segment over said frequency range.

12. A system for locating a sound source within a defined area comprising:
  at least two microphones which receive sound data with a plurality of spaced apart microphones,
  a processor programmed to create a cross spectral density matrix containing vectors of cross correlations and auto correlations of the sound data,
  said processor programmed to create a replica vector matrix containing sound data from at least one test sound at a plurality of predetermined locations within the defined area,
  said processor programmed to project the sound data vectors on the replica vectors to obtain a probability of the location of the sound source at each predetermined location, said probabilities forming a distribution in the defined area, and
  said processor outputting a signal representative of the largest probability distribution as the location of the sound source within the defined area.

13. The system as defined in claim 12 wherein said programmed processor which creates the cross spectral density matrix comprises:
  said processor programmed to convert the sound data from the time domain to the frequency domain for each microphone to form a frequency domain sound vector data matrix, and
  said processor programmed to filter the converted sound data with at least one matched filter corresponding to a predefined sound to form a filtered sound vector data matrix.

14. The system as defined in claim 13 wherein said processor is programmed to disregard filtered data below a predetermined threshold.

15. The system as defined in claim 13 wherein said processor programmed to create the cross spectral density matrix further comprises said processor programmed to normalize the filtered sound vector data matrix.

16. The system as defined in claim 15 wherein said processor programmed to create the cross spectral density matrix further comprises said processor programmed to multiply said normalized filtered sound vector data matrix by its Hermitian transpose.

17. The invention as defined in claim 12 wherein said processor programmed to create a replica vector matrix further comprises said processor programmed to calculate the received sound vector data at each microphone from the test sound at each predetermined location in the defined area using a Green's function.

18. The invention as defined in claim 17 wherein said processor programmed to calculate the received sound vector data at each microphone from the test sound at each predetermined location in the defined area using a Green's function further comprises said processor programmed to calculate the received sound vector data at each microphone from the test sound at each predetermined location in the defined area using a Green's function at a plurality of different frequencies.

19. The invention as defined in claim 12 wherein said processor programmed to project further comprises said processor programmed to apply Bartlett's processor to said cross spectral density matrix and said replica matrix.

20. The invention as defined in claim 19 and said processor programmed to apply Bartlett's processor over a plurality of discrete frequency segments which together form a frequency range, and means for forming an incoherent average of Bartlett's processor for each frequency segment over said frequency range.

21. The invention as defined in claim 12 wherein said processor programmed to project further comprises said processor programmed to apply an MV processor to said cross spectral density matrix and said replica matrix.

22. The invention as defined in claim 21 and said processor programmed to apply the MV processor over a plurality of discrete frequency segments which together form a frequency range, and said processor programmed to form an incoherent average of the MV processor for each frequency segment over said frequency range.

23. A method for locating a wave source within a defined area comprising the steps of:
  receiving wave data with a plurality of spaced apart wave receivers, creating a cross spectral density matrix containing vectors of cross correlations and auto correlations of the wave data, creating a replica vector matrix containing wave data from at least one test wave at a plurality of predetermined locations within the defined area, projecting the wave data vectors on the replica vectors to obtain a probability of the location of the wave source at each predetermined location, said probabilities forming a distribution in the defined area, outputting a signal representative of the largest probability distribution as the location of the sound source within the defined area.

24. The invention as defined in claim 23 wherein said step of creating the cross spectral density matrix comprises the steps of:

converting the sound data from the time domain to the frequency domain for each wave receiver to form a frequency domain sound vector data matrix, and filtering the converted sound data with at least one matched filter corresponding to a predefined sound to form a filtered sound vector data matrix.

25. The invention as defined in claim 24 and comprising the step of disregarding filtered data below a predetermined threshold.

26. The invention as defined in claim 24 wherein said step of creating the cross spectral density matrix further comprises the step of normalizing the filtered sound vector data matrix.

27. The invention as defined in claim 26 wherein said step of creating the cross spectral density matrix further comprises the step of multiplying said normalized filtered sound vector data matrix by its Hermitian transpose.

28. The invention as defined in claim 23 wherein said step of creating a replica vector matrix further comprises the step of calculating the received sound vector data at each microphone from the test sound at each predetermined location in the defined area using a Green's function.

29. The invention as defined in claim 28 wherein said step of calculating the received sound vector data at each microphone from the test sound at each predetermined location in the defined area using a Green's function further comprises the step of calculating the received sound vector data at each microphone from the test sound at each predetermined location in the defined area using a Green's function at a plurality of different frequencies.

30. The invention as defined in claim 23 wherein said projecting step further comprises the step of applying Bartlett's processor to said cross spectral density matrix and said replica matrix.

31. The invention as defined in claim 30 and further comprising the step of applying Bartlett's processor over a plurality of discrete frequency segments which together form a frequency range, and forming an incoherent average of Bartlett's processor for each frequency segment over said frequency range.

32. The invention as defined in claim 23 wherein said wave source comprises a sound wave source.

33. The invention as defined in claim 23 wherein said projecting step further comprises the step of applying an MV processor to said cross spectral density matrix and said replica matrix.

34. The invention as defined in claim 33 and further comprising the step of applying the MV processor over a plurality of discrete frequency segments which together form a frequency range, and forming an incoherent average of the MV processor for each frequency segment over said frequency range.

* * * * *

UNITED STATES PATENT AND TRADEMARK OFFICE
CERTIFICATE OF CORRECTION

PATENT NO. : 7,969,821 B2
APPLICATION NO. : 11/623920
DATED : June 28, 2011
INVENTOR(S) : Serdar H. Yonak It is certified that error appears in the above-identified patent and that said Letters Patent is hereby corrected as shown below:

Column 1, Line 4, Replace "TEE" with --THE--

Column 1, Line 23, Insert --be-- after would

Column 5, Line 44, After [ insert -- $\hat{G}^*(f, \vec{x}1|\vec{x}_t)$ --

Signed and Sealed this
Twenty-seventh Day of December, 2011

David J. Kappos
*Director of the United States Patent and Trademark Office*